(12) United States Patent
Sigamani

(10) Patent No.: US 12,101,032 B2
(45) Date of Patent: Sep. 24, 2024

(54) MULTI-PHASE VOLTAGE CONVERTER CURRENT BALANCING

(71) Applicant: Astec International Limited, Kowloon (HK)

(72) Inventor: James Sigamani, Manila (PH)

(73) Assignee: Astec International Limited, Kowloon (HK)

( * ) Notice: Subject to any disclaimer, the term of this patent is extended or adjusted under 35 U.S.C. 154(b) by 211 days.

(21) Appl. No.: 17/823,849

(22) Filed: Aug. 31, 2022

(65) Prior Publication Data

US 2024/0072673 A1 Feb. 29, 2024

(51) Int. Cl.
H02M 3/335 (2006.01)
H02M 3/00 (2006.01)

(52) U.S. Cl.
CPC ......... *H02M 3/33571* (2021.05); *H02M 3/01* (2021.05)

(58) Field of Classification Search
CPC .......................... H02M 3/01; H02M 3/33571
USPC ...................................... 363/21.02
See application file for complete search history.

(56) References Cited

U.S. PATENT DOCUMENTS

| | | | |
|---|---|---|---|
| 5,877,951 A | 3/1999 | Mweene | |
| 9,077,255 B2 | 7/2015 | Fu et al. | |
| 9,780,678 B2 | 10/2017 | Adragna et al. | |
| 10,069,397 B2 | 9/2018 | Vaidya et al. | |
| 10,181,732 B2 | 1/2019 | Eckert et al. | |
| 10,593,566 B2 | 3/2020 | Parrish et al. | |
| 11,146,176 B2 | 10/2021 | Sigamani | |
| 11,557,976 B2 | 1/2023 | Sigamani | |
| 2007/0086224 A1* | 4/2007 | Phadke | H02M 3/285 363/65 |
| 2009/0303753 A1 | 12/2009 | Fu et al. | |
| 2010/0328968 A1* | 12/2010 | Adragna | H02M 3/01 363/21.02 |

(Continued)

FOREIGN PATENT DOCUMENTS

| | | | |
|---|---|---|---|
| CA | 3126832 A1 * | 7/2020 | ............. B60L 53/20 |
| CN | 106300957 A | 1/2017 | |
| CN | 108964478 A | 12/2018 | |

OTHER PUBLICATIONS

Yang Jiao, et al.; Topology Evaluation and Comparison for Isolated Multilevel DC/DC Converter for Power Cell in Solid State Transformer; IEEE; 2019; 8 pages.

(Continued)

*Primary Examiner* — Yemane Mehari

(57) ABSTRACT

A three-phase power supply circuit comprises three LLC resonant voltage converters and a transformer assembly comprising three primary coil assemblies and three secondary coil assemblies. Each primary coil assembly comprises a first primary winding having a first node electrically coupled with a respective first voltage output of the pair of voltage inputs of a respective LLC resonant voltage converter of the three LLC resonant voltage converters and a second node. Each primary coil assembly also comprises a second primary winding comprising a first node and a second node electrically coupled with a respective second voltage output of the pair of voltage inputs of the respective LLC resonant voltage converter. The second nodes of the first primary windings are electrically coupled together, and the first nodes of the second primary windings are electrically coupled together.

20 Claims, 8 Drawing Sheets

(56) References Cited

U.S. PATENT DOCUMENTS

| | | |
|---|---|---|
| 2014/0218973 A1 | 8/2014 | Popovici et al. |
| 2020/0007050 A1 | 1/2020 | Fu et al. |
| 2020/0228022 A1 | 7/2020 | Hu et al. |
| 2020/0328696 A1* | 10/2020 | Dehem ............. H02M 3/33571 |
| 2020/0366211 A1 | 11/2020 | Zhang et al. |

OTHER PUBLICATIONS

Zong et al.; Three-level Frequency-Doubling LLC Resonant Converter with High Step-down Ration for High Input Voltage Applications; IEEE; 2014; 6 pages.

* cited by examiner

MULTI-PHASE VOLTAGE CONVERTER CURRENT BALANCING

TECHNICAL FIELD

Aspects of the disclosure are related to electronic components and in particular to components for three-phase power systems.

BACKGROUND

Three-phase LLC power converters are commonly used in a variety of systems including telecom systems, fast chargers for electric vehicles, and other applications requiring high power density and high efficiency.

These three-phase LLC power converters typically include an inductor/transformer pair for each of the three phases. Current imbalance circulating among the primary currents due to differences in component value tolerances can negatively impact the converter efficiency and can even cause the converter to fail.

SUMMARY

In accordance with one aspect of the present disclosure, a three-phase power supply circuit comprises three LLC resonant voltage converters, each converter comprises a pair of voltage inputs and a pair of voltage outputs. A transformer assembly is electrically coupled with the three LLC resonant voltage converters and comprises three primary coil assemblies and three secondary coil assemblies. Each primary coil assembly of the three primary coil assemblies comprises a first primary winding having a first node electrically coupled with a respective first voltage output of the pair of voltage inputs of a respective LLC resonant voltage converter of the three LLC resonant voltage converters and a second node. Each primary coil assembly further comprises a second primary winding having a first node and a second node electrically coupled with a respective second voltage output of the pair of voltage inputs of the respective LLC resonant voltage converter. The second nodes of the first primary windings are electrically coupled together, and the first nodes of the second primary windings are electrically coupled together.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

In the drawings.

Figure 1:
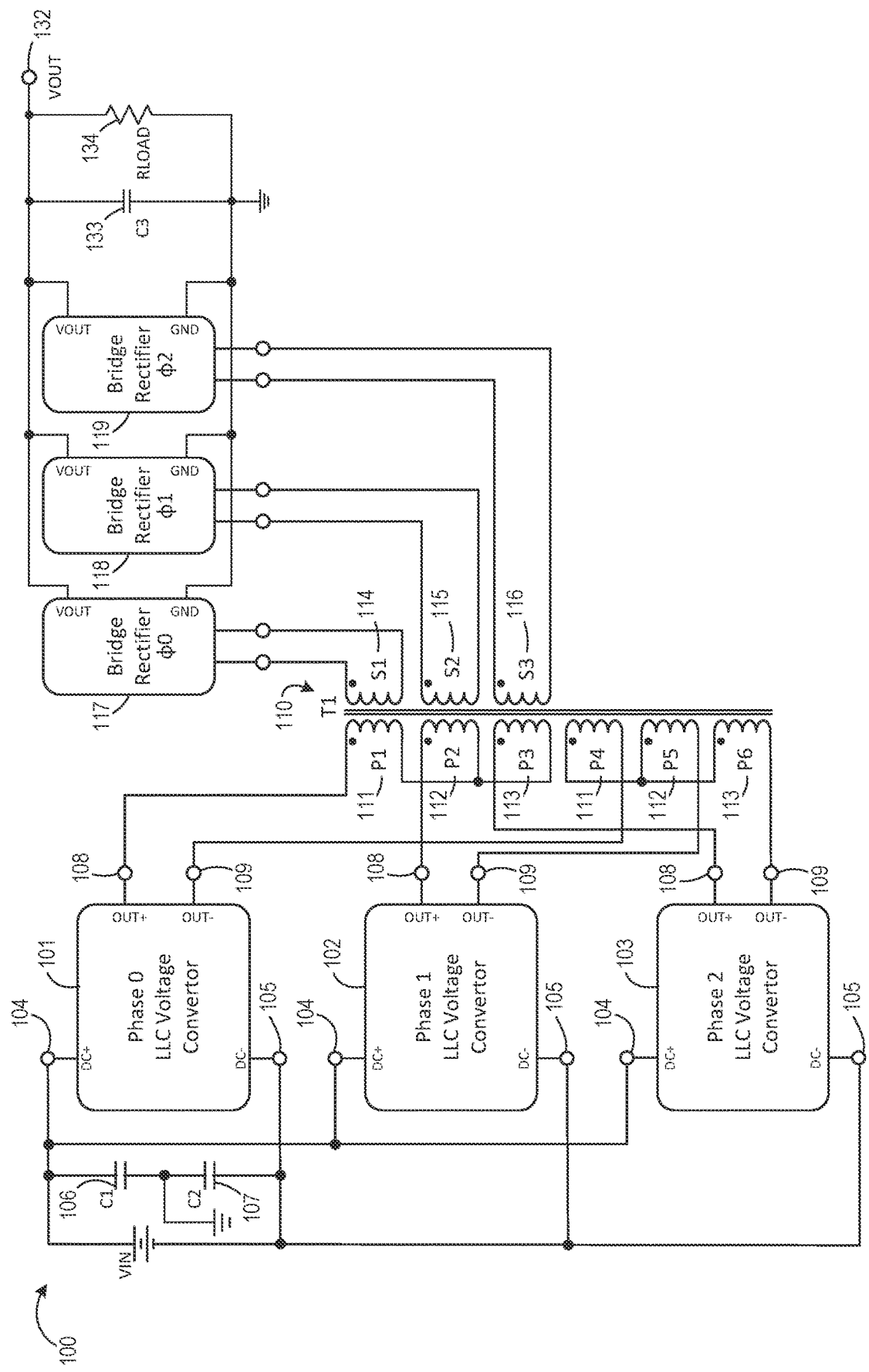
FIG. 1 is an exemplary three-phase power supply circuit including three LLC resonant voltage converters according to an embodiment.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

FIG. 1 illustrates an exemplary three-phase power supply circuit 100 including three LLC resonant voltage convertors. This example power supply circuit 100 comprises three LLC resonant voltage convertors 101, 102, 103, such as the LLC resonant voltage convertors of FIGS. 2-10 described below.

Each of the three LLC resonant voltage convertors 101, 102, and 103 includes a pair of voltage inputs 104, 105 (DC+ and DC−). An input voltage VIN is applied to the DC+ and DC− inputs 104, 105 of the voltage convertors 101, 102, and 103 across capacitors C1 106 and C2 107, which act to divide the input voltage VIN in half when the values of C1 106 and C2 107 are the same.

Each of the three LLC resonant voltage convertors 101, 102, and 103 includes a pair of voltage outputs 108, 109 (OUT+ and OUT−). A current generated by a voltage converter (e.g., 101) and supplied via its voltage output OUT+ 108, for example, flows through a transformer assembly T1 110, through the other two voltage converters (e.g., 102, 103), and returns through the voltage output OUT− 109. When supplied via the voltage output OUT− 109, the generated current returns to the voltage output OUT+ 108 after flowing through the voltage converters 102, 103 and the transformer assembly 110. In the embodiments of the voltage convertors 101, 102, and 103 disclosed herein, conversion of the input voltage VIN to output currents requires the pair of voltage outputs 108, 109. LLC voltage converters with only a single output electrically coupled with a transformer assembly are not contemplated herein.

Figure 2:
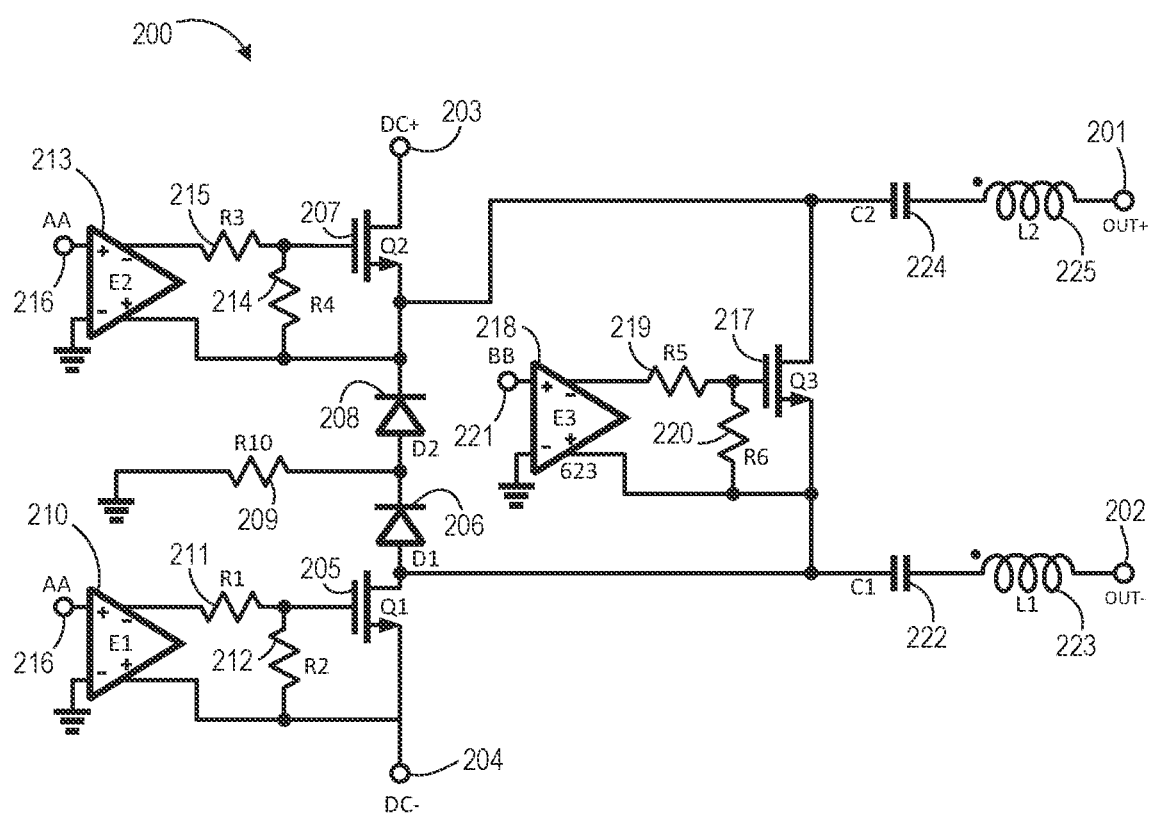
FIG. 2 illustrates an exemplary single-phase LLC resonant voltage converter for use within the three-phase power supply circuit of FIG. 1, 5 or 8 according to an embodiment.

FIG. 2 illustrates an exemplary single-phase LLC resonant voltage converter 200 with a pair of voltage outputs 201, 202 for use within the three-phase power supply circuits disclosed herein. In this example embodiment, an input voltage is applied to inputs DC+ 203 and DC− 204 of the voltage convertor 200. In some example embodiments the input voltage may be provided by a power factor correction circuit.

Switch Q1 205 and diode D1 206 make up a first half-bridge, and switch Q2 207 and diode D2 208 make up a second half-bridge. Diodes D1 206 and D2 208 are blocking diodes, which block current when switches Q1 205 and Q2 207 are turned on simultaneously. In one embodiment, a resistor R10 209 is included between diodes D1 206 and D2 208 to couple them to ground. In another embodiment, diodes D1 206 and D2 208 may be coupled to ground directly without resistor R10 209.

Switch Q1 205 is driven by isolated driver E1 210 and resistors R1 211 and R2 212. Switch Q2 207 driven by isolated driver E2 213 and resistors R3 214 and R4 215. Isolated drivers E1 213 and E2 213 are both driven by square wave AA 216 generated by a control circuit (not shown).

The maximum voltage stress on switches Q1 205 and Q2 207 is equal to half of the input voltage between DC+ 203 and DC− 204, while switch Q3 217 experiences the entire voltage stress of the input voltage between DC+ 203 and DC− 204. In an example embodiment, when the input voltage between DC+ 203 and DC− 204 is 440 volts, switches Q1 205 and Q2 207 may be rated for 300-400 volts, while Q3 217 is rated for 600-650 volts.

Switch Q3 217 is configured to short diodes D1 206 and D2 208 when it is activated by isolated driver E3 218 and resistors R5 219 and R6 220. Isolated driver E3 218 is driven by square wave BB 221 generated by a control circuit (not shown).

Each half-bridge drives one primary node of a primary coil of an external transformer through a capacitor/inductor pair. The first half-bridge comprising switch Q1 205 and diode D1 206 drives the external transformer primary coil through split resonant components capacitor C1 222 and inductor L1 223, electrically coupled in series. The second half-bridge comprising switch Q2 207 and diode D2 208 drives the external transformer primary coil through split resonant components capacitor C2 224 and inductor L2 225, electrically coupled in series. Output voltages OUT+ 201 and OUT− 202 are provided to first and second nodes of the primary coil assembly of an external transformer assembly as described herein. In the embodiment illustrated in FIG. 2, a resonant tank portion of the LLC resonant voltage converter 200 includes capacitors 222, 224 and inductors 223, 225.

Figure 3:
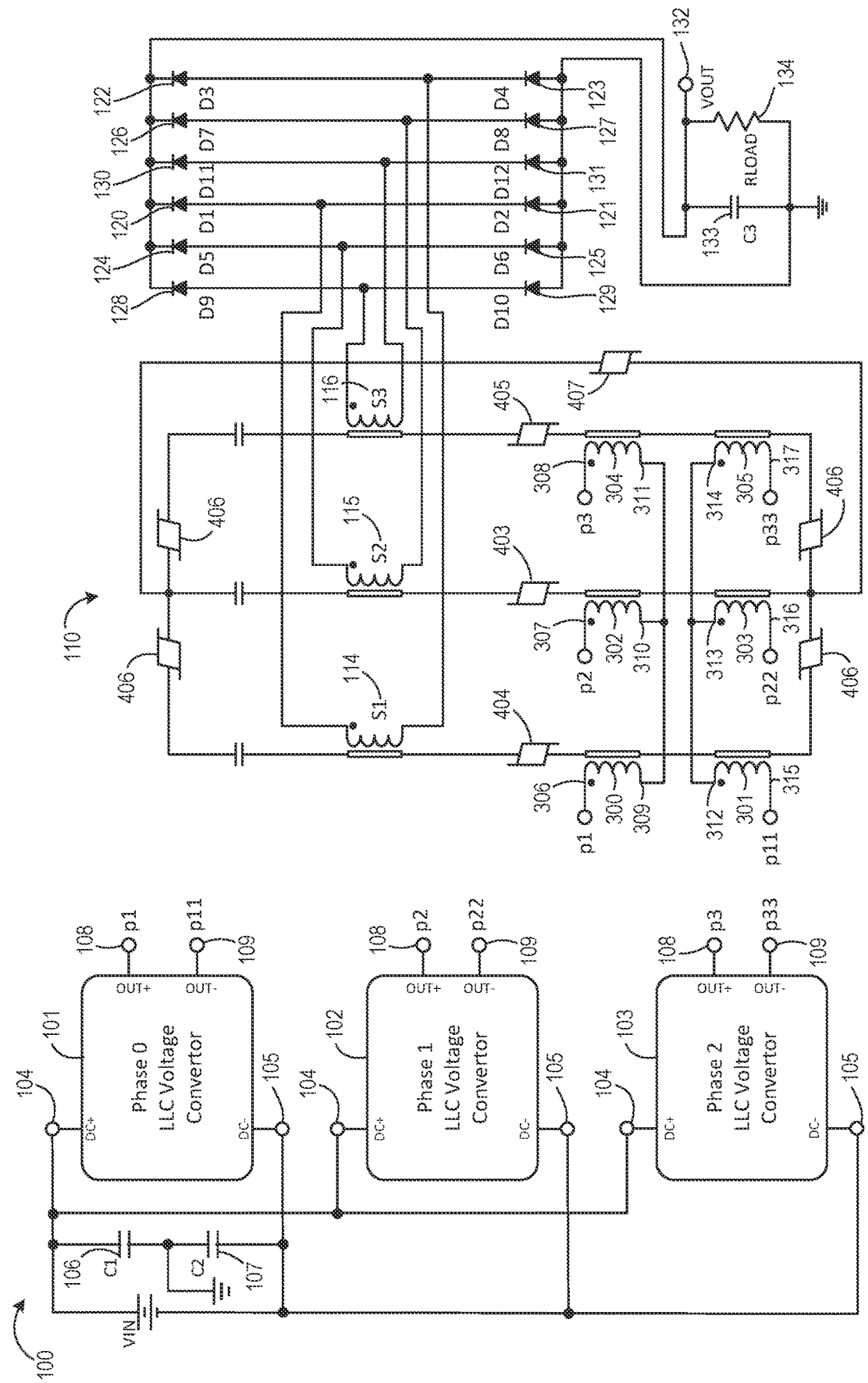
FIG. 3 is an embodiment of the three-phase power supply circuit of FIG. 1 according to an example.

Referring back to FIG. 1 and to FIG. 3, the voltage outputs 108, 109 of each LLC resonant voltage convertor 101-103 is electrically coupled with a respective primary winding assembly 111, 112, 113 of the transformer assembly 110. In a multi-phase interleaved LLC resonant voltage convertor power supply such as that illustrated in FIG. 1, a current imbalance circulating among the primary currents due to differences in component value tolerances can negatively impact the converter efficiency. Accordingly, embodiments of the transformer assembly 110 disclosed herein combat current imbalance. As illustrated, the primary winding assembly 111 is formed from a pair of primary windings P1 300 and P4 301, the primary winding assembly 112 is formed from a pair of primary windings P2 302 and P5 303, and the primary winding assembly 113 is formed from a pair of primary windings P3 304 and P6 305. Thus, the primary winding assembly coupled to each LLC voltage converter includes a pair of primary windings.

Primary winding P1 300 includes a first node 306 at its dot end electrically coupled with the voltage output 108 of the LLC resonant voltage convertor 101. Primary winding P2 302 includes a first node 307 at its dot end electrically coupled with the voltage output 108 of the LLC resonant voltage convertor 102. Primary winding P3 304 includes a first node 308 at its dot end electrically coupled with the voltage output 108 of the LLC resonant voltage convertor 103. Second nodes 309, 310, 311 opposite the dot ends of the primary windings P1-P3 are electrically coupled together.

First nodes 312, 313, 314 at the dot ends of the primary windings P4-P6 are electrically coupled together. Primary winding P4 301 includes a second node 315 opposite its dot end electrically coupled with the voltage output 109 of the LLC resonant voltage convertor 101. Primary winding P5 303 includes a second node 316 opposite its dot end electrically coupled with the voltage output 109 of the LLC resonant voltage convertor 102. Primary winding P6 305 includes a second node 317 opposite its dot end electrically coupled with the voltage output 109 of the LLC resonant voltage convertor 103.

The total primary number of windings is P1+P2=P3+P4=P5+P6. Thus, the primary windings per phase are split into equal halves. In one embodiment, primary windings P1-P6 have an equal number of turns. The electrically coupled finish ends of the first half of windings (e.g., the second nodes 309-311 of windings P1-P3) are shorted together to form one floating star connection. Similarly, the start end of the second half of windings (e.g., the first nodes 312-314 of windings P4-P6) are connected to form another floating star connection. When electrically coupled with LLC voltage converters with split resonant components (e.g., capacitors 222, 224 and inductors 223, 225 LLC resonant voltage converter 200 of FIG. 2), an advantage related to substantially equal voltages with opposite polarity at the transformer terminals reduce common mode (CM) noise.

Three secondary windings S1-S3 114, 115, 116 of the transformer assembly 110 are inductively coupled with primary winding assemblies 111, 112, 113 and electrically coupled with respective bridge rectifiers 117, 118, 119. A current inductively generated in secondary winding 114 by primary winding assembly 111 drives diodes D1-D4 120-123 of the bridge rectifier 117. A current inductively generated in secondary winding 115 by primary winding assembly 112 drives diodes D5-D8 124-127 of the bridge rectifier 118. A current inductively generated in secondary winding 116 by primary winding assembly 113 drives diodes D9-D12 128-131 of the bridge rectifier 119. The output of the bridge rectifier 119 produces output voltage VOUT 132 across output filter capacitor C3 133 driving load resistance RLOAD 134.

Figure 4:
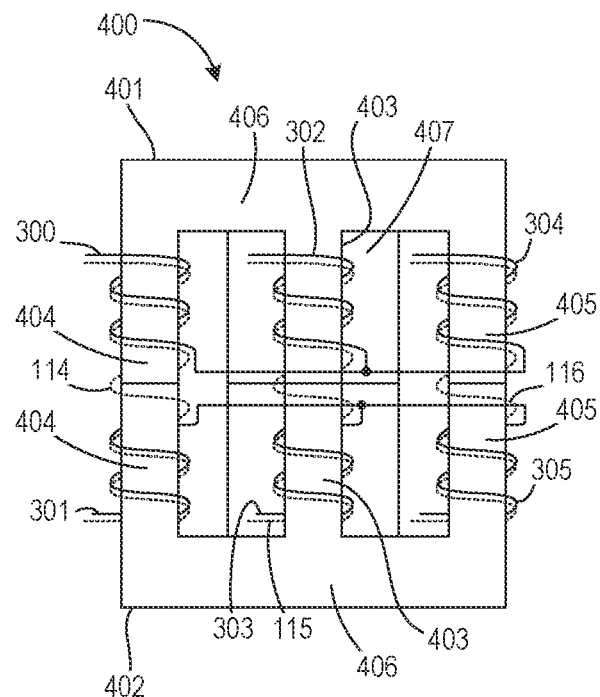
FIG. 4 illustrates a winding arrangement of the transformer assembly of FIG. 3 on an exemplary unified core body according to an embodiment.

As illustrated in FIG. 4, a winding relationship is shown of the primary winding assemblies 111, 112, 113 and secondary windings 114, 115, 116 about a core 400 that together form a three-phase magnetics assembly. The core 400 has an upper E portion 401 and a lower E portion 402. Each portion 401, 402 has a central leg or limb portion 403 and first and second outer legs or limb portions leg 404, 405. In addition, a base portion 406 of each core portion 401, 402 is joined to the legs 403-405. The arrangement of the primary winding assemblies 111, 112, 113 and secondary windings 114, 115, 116 about the core legs 403-405 results in a sum of the flux in the winding legs that is not zero. As such, a common core return leg 407 is provided for the windings on the core legs 403-405. Magnetic fluxes from the three phases (e.g., LLC resonant voltage convertors 101, 102, 103) within the core return leg 407 act to provide a path for the third harmonic flux.

Figure 5:
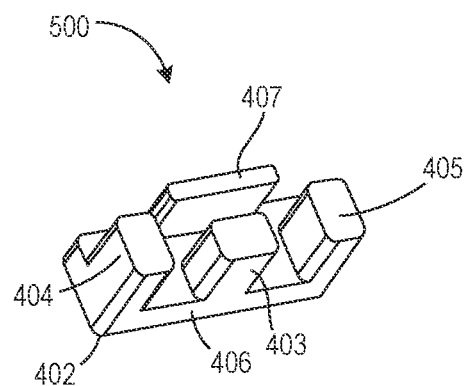
FIG. 5 illustrates an isometric view of a core body portion of FIG. 4 according to an embodiment.

FIG. 5 illustrates an isometric view of a core body 500 of the exemplary lower E portion 402 of the core 400 of FIG. 4 according to an embodiment. Another core body (not shown) mirroring the core body 500 may be used for the upper E portion 401. The two core bodies may have the respective primary windings 300-305 wound thereabout together with the secondary windings 114-116 and joined to form the completed core 400 illustrated in FIG. 4.

Figure 6:
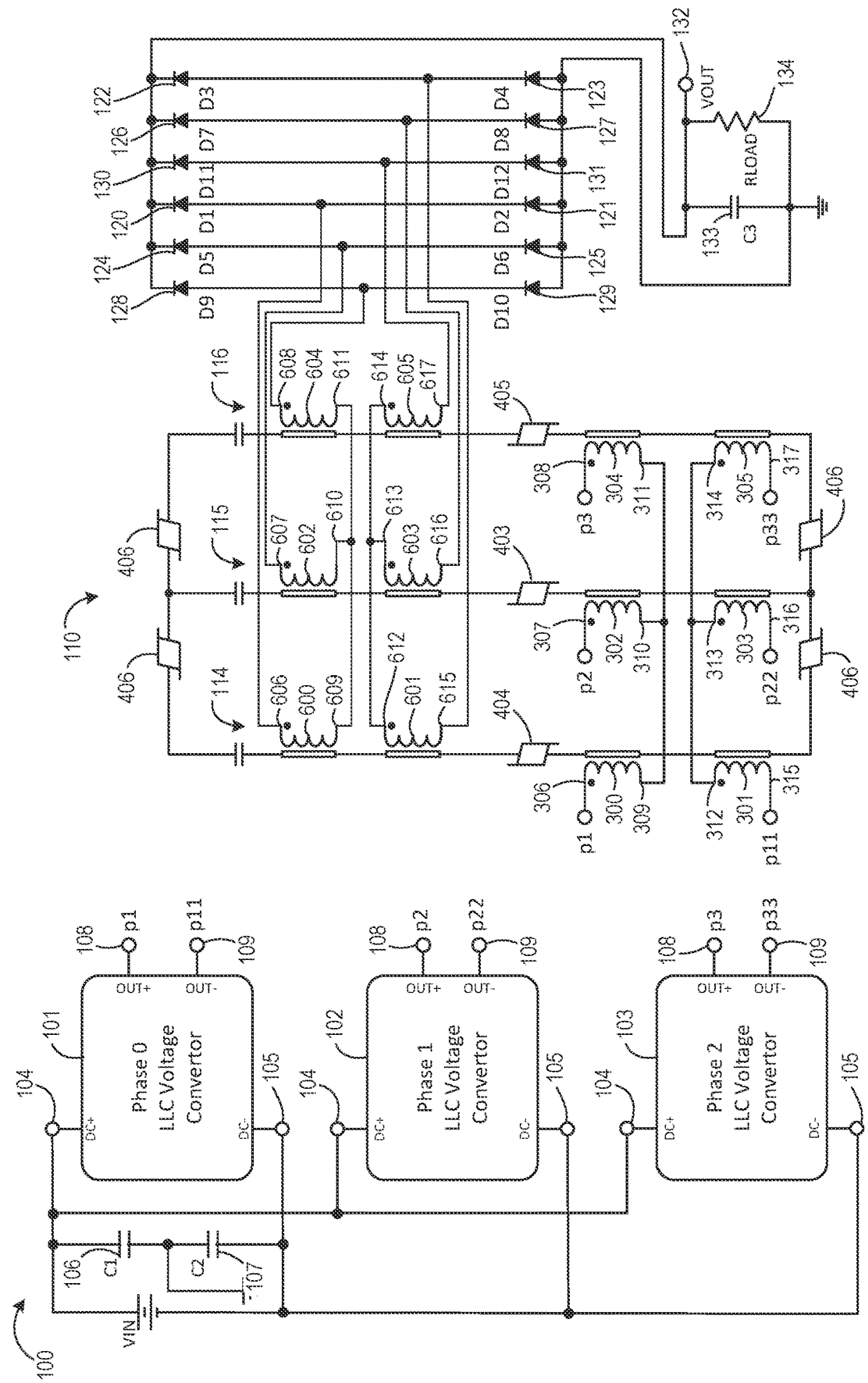
FIG. 6 is an embodiment of the three-phase power supply circuit of FIG. 1 according to another embodiment.

FIG. 6 illustrates an embodiment of the three-phase power supply circuit of FIG. 1 according to another embodiment. Similar to the embodiment illustrated in FIG. 3, the power supply circuit of FIG. 4 includes star-connected primary windings 300-305. In addition, the secondary winding assemblies 114-116 are also star-connected.

As illustrated, the secondary winding assembly 114 is formed from a pair of secondary windings P1 600 and P4 601, the secondary winding assembly 115 is formed from a pair of secondary windings P2 602 and P5 603, and the secondary winding assembly 116 is formed from a pair of secondary windings P3 604 and P6 605. Thus, the secondary winding assembly coupled to each bridge rectifiers 117-119 includes a pair of secondary windings.

Secondary winding 600 includes a first node 606 at its dot end electrically coupled with the diode pair D1, D2 of the bridge rectifier 117. Secondary winding 602 includes a first node 607 at its dot end electrically coupled with diode pair D5, D6 of the bridge rectifier 118. Secondary winding 604 includes a first node 608 at its dot end electrically coupled with the diode pair D9, D10 of the bridge rectifier 119. Second nodes 609, 610, 611 opposite the dot ends of the secondary windings 600, 602, 604 are electrically coupled together.

First nodes 612, 613, 614 at the dot ends of the secondary windings 601, 603, 605 are electrically coupled together. Secondary winding 601 includes a second node 615 opposite its dot end electrically coupled with the diode pair D3, D4 of the bridge rectifier 117. Secondary winding P5 303 includes a second node 616 opposite its dot end electrically coupled with the diode pair D7, D8 of the bridge rectifier 118. Secondary winding P6 305 includes a second node 617 opposite its dot end electrically coupled with the diode pair D11, D12 of the bridge rectifier 119.

Figure 7:
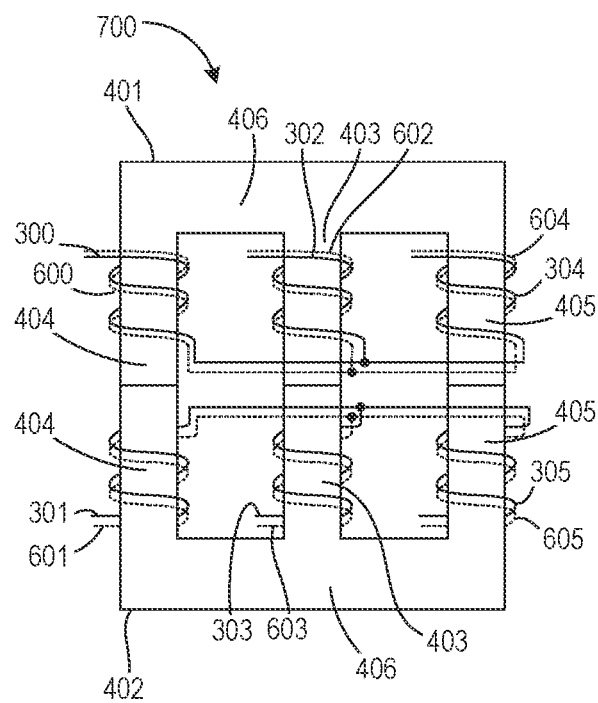
FIG. 7 illustrates a winding arrangement of the transformer assembly of FIG. 6 on an exemplary unified core body according to an embodiment.
Figure 8:
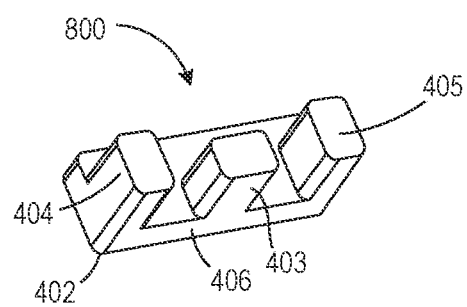
FIG. 8 illustrates a partial isometric view of the exemplary unified core body of FIG. 7 according to an embodiment.

As illustrated in FIG. 7, a winding relationship is shown of the primary winding assemblies 111, 112, 113 and secondary winding assemblies 114, 115, 116 about a core 700 that together form a three-phase magnetics assembly. As described above with respect to FIGS. 4 and 5, the sum of the flux in the winding legs are not zero. In contrast and with regard to the circuit arrangements illustrated in FIGS. 6 and 7, because of the star connection of both the primary windings 300-305 and the secondary windings 600-602 and 603-605, the sum of the flux in the winding legs is zero or a negligible value. Thus, the core 700 may be implemented using the structure of the core 400 of FIG. 4 without the core return leg 407. Thus, FIG. 8 illustrates an isometric view of a core body 800 of the exemplary lower E portion 402 of the core 700 that includes the legs 403-405 about which the primary and secondary winding assemblies 111-116 are wound. The core return leg 407 of FIG. 5 is not needed.

Figure 9:
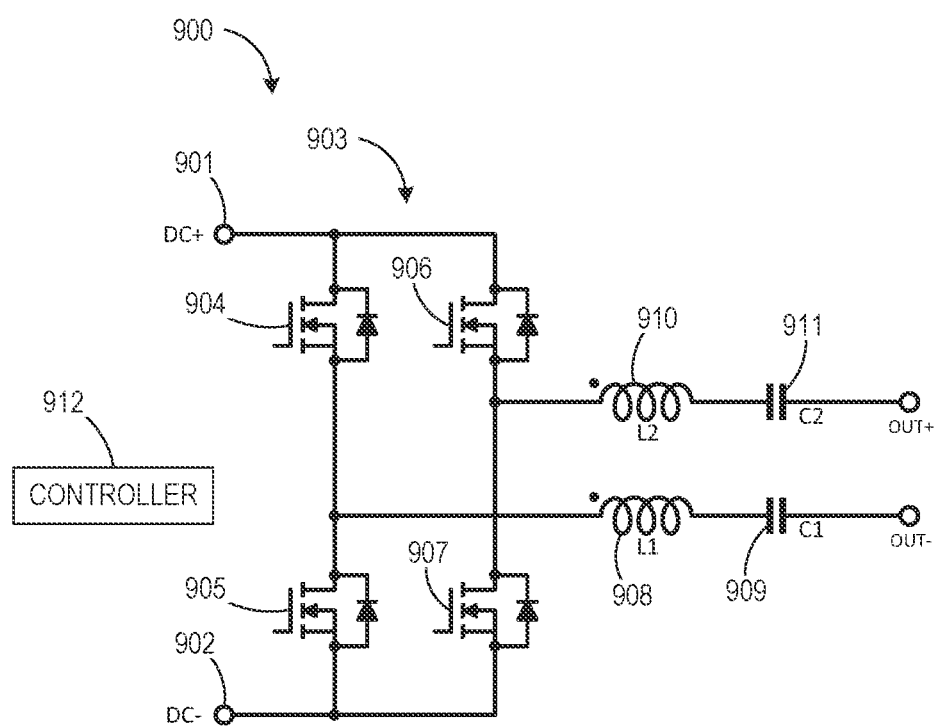
FIG. 9 illustrates an exemplary single-phase LLC resonant voltage converter for use within the three-phase power supply circuit of FIG. 1, 3 or 6 according to an embodiment.

FIG. 9 illustrates an exemplary single-phase LLC resonant voltage converter 900 for use as an LLC resonant voltage convertor (e.g., such as converters 101, 102, 103) according to an embodiment. The LLC voltage converter 900 is shown implemented as a resonant full-bridge LLC series converter and has a voltage input formed from a pair of voltage input terminals DC+ and DC− 901, 902 that are coupleable with the input voltage VIN illustrated in FIG. 1. The LLC voltage converter 900 includes a switching bridge 903 having a first pair of power switches 904, 905 coupled in series and in parallel with the respective voltage inputs and a second pair of power switches 906, 907 coupled in series and in parallel with the respective voltage inputs. A first resonant inductor 908 is serially coupled between the first pair of power switches 904, 905 and a first resonant capacitor 909. A second resonant inductor 910 is serially coupled between the second pair of power switches 906, 907 and a second resonant capacitor 911.

A controller 912 is coupled to control the power switches 904-907 using pulse-width modulation (PWM) signals in a synchronous manner such that power conversion in the voltage converter 900 is in out of phase with the power conversion in the other voltage converters 102, 103 such as with a phase difference of 120°. For example, the PWM signals may control the on and off states of the power switches 904, 907 together and the on and off states of the power switches 905, 906 together.

Figure 10:
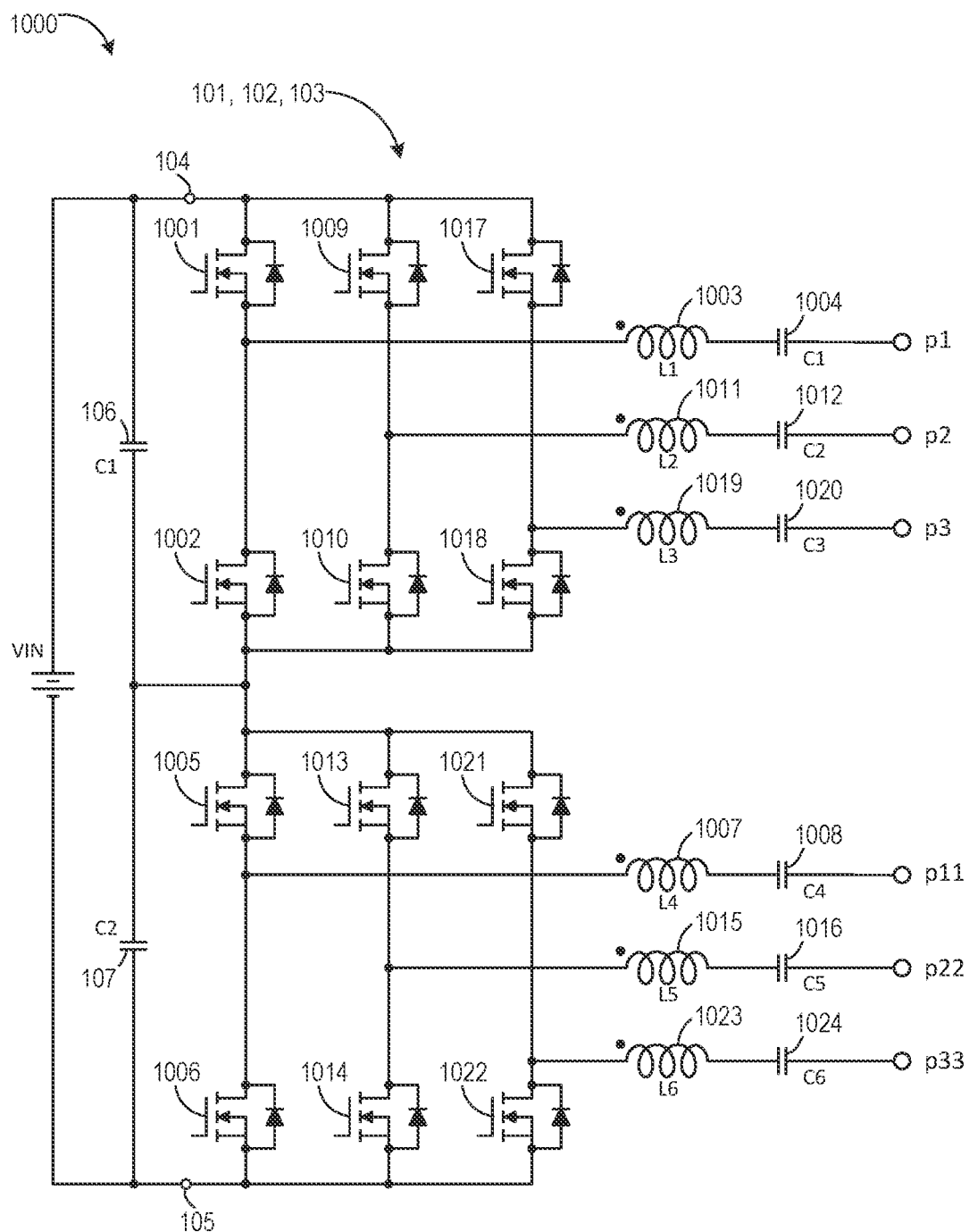
FIG. 10 illustrates an exemplary three-phase LLC resonant voltage converter for use within the three-phase power supply circuit of FIG. 1, 3 or 6 according to an embodiment.

FIG. 10 illustrates an exemplary three-phase LLC resonant voltage converter 1000 according to another embodiment. In this embodiment, each of the LLC resonant voltage convertors 101-103 includes two sets of power switch pairs coupled with respective resonant inductors and capacitors. The LLC resonant voltage convertor 101 includes a first pair of power switches 1001, 1002 coupled with a resonant inductor 1003 and a resonant capacitor 1004. The LLC resonant voltage convertor 101 also includes a second pair of power switches 1005, 1006 coupled with a resonant inductor 1007 and a resonant capacitor 1008. The LLC resonant voltage convertors 102, 103 are similarly constructed. For example, the LLC resonant voltage convertor 102 includes power switches 1009, 1010, resonant inductor 1011, and resonant capacitor 1012 in a first arrangement and includes power switches 1013, 1014, resonant inductor 1015, and resonant capacitor 1016 in a second arrangement. The LLC resonant voltage convertor 103 includes power switches 1017, 1018, resonant inductor 1019, and resonant capacitor 1020 in a first arrangement and includes power switches 1021, 1022, resonant inductor 1023, and resonant capacitor 1024 in a second arrangement. As illustrated, the first pairs of power switches ((1001, 1002), (1009, 1010), (1017, 1018)) are coupled in parallel, and the second pairs of power switches ((1005, 1006), (1013, 1014), (1021, 1022)) are coupled in parallel. The first pairs of switches are further coupled in series with the second set pairs of power switches. Additionally, the series-connected first and second pairs of switches are coupled in parallel with the input voltage VIN.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

The invention claimed is:

1. A three-phase power supply circuit comprising:
   three LLC resonant voltage converters, each converter comprising:
      a pair of voltage inputs; and
      a pair of voltage outputs; and
   a transformer assembly electrically coupled with the three LLC resonant voltage converters and comprising:
      three primary coil assemblies; and
      three secondary coil assemblies;
   wherein each primary coil assembly of the three primary coil assemblies comprises:
      a first primary winding comprising:
         a first node electrically coupled with a respective first voltage output of the pair of voltage inputs of a respective LLC resonant voltage converter of the three LLC resonant voltage converters; and
         a second node; and
      a second primary winding comprising:
         a first node; and
         a second node electrically coupled with a respective second voltage output of the pair of voltage inputs of the respective LLC resonant voltage converter;
   wherein the second nodes of the first primary windings are electrically coupled together;
   wherein the first nodes of the second primary windings are electrically coupled together.

2. The three-phase power supply circuit of claim 1, wherein a current generated in a first LLC resonant voltage converter of the three LLC resonant voltage converters and supplied to the transformer assembly passes through at least a resonant portion of both of the other LLC resonant voltage converters prior to returning to the first LLC resonant voltage converter.

3. The three-phase power supply circuit of claim 1, wherein the first nodes of the second primary windings and the second nodes of the first primary windings are electrically coupled in a star configuration.

4. The three-phase power supply circuit of claim 1, wherein the transformer assembly is constructed on a unified core body.

5. The three-phase power supply circuit of claim 4, wherein the unified core body comprises three core legs.

6. The three-phase power supply circuit of claim 5, wherein each primary coil assembly is wound about a respective core leg of the three core legs.

7. The three-phase power supply circuit of claim 6, wherein the unified core body further comprises a transformer return leg configured to conduct magnetic flux between first and second ends of the core legs within the transformer assembly.

8. The three-phase power supply circuit of claim 7, wherein magnetic fluxes from each of the three primary coil assemblies partially cancel each other within the transformer return leg.

9. The three-phase power supply circuit of claim 6 further comprising a bridge rectifier assembly electrically coupled with the transformer assembly;
   wherein the bridge rectifier assembly comprises three bridge rectifiers, each bridge rectifier comprising a first pair of diodes electrically coupled in series and a second pair of diodes electrically coupled in series, wherein the first pair of diodes is electrically coupled in parallel with the second pair of diodes.

10. The three-phase power supply circuit of claim 9, wherein each secondary coil assembly of the three secondary coil assemblies comprises a first secondary winding comprising a first node and a second node.

11. The three-phase power supply circuit of claim 10, wherein each first node of each first secondary winding is electrically coupled with the first pair of diodes of a respective bridge rectifier.

12. The three-phase power supply circuit of claim 11, wherein each second node of each first secondary winding is electrically coupled with the second pair of diodes of the respective bridge rectifier.

13. The three-phase power supply circuit of claim 11, wherein each secondary coil assembly of the three secondary coil assemblies further comprises a second secondary winding comprising a first node and a second node.

14. The three-phase power supply circuit of claim 13, wherein the second nodes of the first secondary windings are electrically coupled together;
   wherein the first nodes of the second secondary windings are electrically coupled together; and
   wherein each second node of each second secondary winding is electrically coupled with the second pair of diodes of the respective bridge rectifier.

15. The three-phase power supply circuit of claim 14, wherein the unified core body lacks a transformer return leg configured to conduct magnetic flux between first and second ends of the core legs within the transformer assembly.

16. The three-phase power supply circuit of claim 1, wherein each LLC resonant voltage converter comprises:
   a pair of input terminals for receiving a voltage input from an input power source;
   a pair of output terminals for supplying a direct current (DC) voltage output to a load;
   two switches and two diodes coupled in a three-level LLC circuit arrangement between the pair of input terminals and the pair of output terminals, the two switches and two diodes comprising:
      a first switch and first diode configured as a first half-bridge;
      a second switch and second diode configured as a second half-bridge; and
   a third switch coupled across the first and second diodes to short circuit the first and second diodes in response to the third switch being in a conductive mode.

17. The three-phase power supply circuit of claim 16, wherein each LLC resonant voltage converter further comprises:
   a first capacitor and a first inductor electrically coupled in series between the first half-bridge and the first voltage output of the respective LLC resonant voltage converter; and a second capacitor and a second inductor electrically couple in series between the second half-bridge and the second voltage output of the respective LLC resonant voltage converter.

18. The three-phase power supply circuit of claim 1, wherein each LLC resonant voltage converter comprises a switch assembly comprising:
- a first pair of switches electrically coupled in series;
- a second pair of switches electrically coupled in series;
- a first capacitor and a first inductor electrically coupled in series between the first pair of switches and the first voltage output of the respective LLC resonant voltage converter; and
- a second capacitor and a second inductor electrically couple in series between the second pair of switches and the second voltage output of the respective LLC resonant voltage converter.

19. The three-phase power supply circuit of claim 18, wherein the first pair of switches is electrically coupled in parallel with the second pair of switches; and
  wherein the first pair of switches is electrically coupled in parallel with the pair of voltage inputs.

20. The three-phase power supply circuit of claim 18, wherein the first pairs of switches of the three LLC resonant voltage converters are coupled together in parallel in a first switch arrangement;
  wherein the second pairs of switches of the three LLC resonant voltage converters are coupled together in parallel in a second switch arrangement;
  wherein the first switch arrangement is electrically coupled in series with the second switch arrangement in a third switch arrangement; and
  wherein the third switch arrangement is electrically coupled in parallel with the pair of voltage inputs.

* * * * *

UNITED STATES PATENT AND TRADEMARK OFFICE
CERTIFICATE OF CORRECTION

PATENT NO. : 12,101,032 B2
APPLICATION NO. : 17/823849
DATED : September 24, 2024
INVENTOR(S) : James Sigamani It is certified that error appears in the above-identified patent and that said Letters Patent is hereby corrected as shown below:

In the Claims

Column 7, Line 31, of Claim 1, "voltage inputs" should read -- voltage outputs --.
Column 7, Line 38, of Claim 1, "voltage inputs" should read -- voltage outputs --.

Signed and Sealed this
Fifth Day of November, 2024

Katherine Kelly Vidal
*Director of the United States Patent and Trademark Office*